United States Patent [19]
Nakano et al.

[11] Patent Number: 6,095,490
[45] Date of Patent: Aug. 1, 2000

[54] FLOW CONTROL VALVE FOR REDUCING VALVE LEAKAGE

[75] Inventors: Yuji Nakano, Toyota; Shigeru Hasegawa, Nagoya; Hiroshi Takeyama, Obu; Yasuyoshi Yamada, Nagoya, all of Japan

[73] Assignee: Denso Corporation, Japan

[21] Appl. No.: 09/119,744

[22] Filed: Jul. 21, 1998

[30] Foreign Application Priority Data

| Jul. 25, 1997 | [JP] | Japan | .................................. 9-199559 |
| Apr. 28, 1998 | [JP] | Japan | .................................. 10-119168 |
| Apr. 28, 1998 | [JP] | Japan | .................................. 10-119536 |

[51] Int. Cl.$^7$ .............................. F16K 25/00; F16K 31/02
[52] U.S. Cl. ...................................... 251/129.17; 251/86
[58] Field of Search .................... 251/129.17, 86, 251/291, 333, 335.2

[56] References Cited

U.S. PATENT DOCUMENTS

| 3,519,245 | 7/1970 | Hyde ........................................... 251/86 |
| 4,211,257 | 7/1980 | Sakakibara et al. ...................... 251/86 |
| 4,368,755 | 1/1983 | King ............................................ 251/333 |
| 4,481,699 | 11/1984 | Knapp et al. ...................... 251/129.17 |
| 4,830,286 | 5/1989 | Asslaender et al. ............... 251/129.17 |
| 5,158,263 | 10/1992 | Shimizu et al. ................... 251/129.17 |
| 5,318,272 | 6/1994 | Smith ................................ 251/129.12 |
| 5,897,096 | 4/1999 | Nakano ..................................... 251/65 |

FOREIGN PATENT DOCUMENTS

| 0023172 A1 | 1/1981 | European Pat. Off. . |
| 0536047 A1 | 4/1993 | European Pat. Off. . |
| 4-27277 U | of 0000 | Japan . |
| 54-117940 | of 0000 | Japan . |
| 2068509A | 8/1981 | United Kingdom . |
| WO 87/06318 | 10/1987 | WIPO . |

*Primary Examiner*—Kevin Shaver
*Assistant Examiner*—Eric Keasel
*Attorney, Agent, or Firm*—Nixon & Vanderhye PC

[57] ABSTRACT

A flow control valve having a seating surface formed on a valve element to contact a valve seat when the valve is closed has a shape of a part of a hypothetical spherical surface having a spherical center at a center of a supporting member. Therefore, the distance from the center of the supporting member to the seating surface is kept constant, and the valve element can be seated at a periphery of the valve seat without a gap, even if the shaft is inclined. Thus, the valve leakage is reduced. The supporting member supports a shaft connected to the valve element movable in an axial direction of the shaft. The center of the supporting member is aligned with a center of the valve seat. Movement of the supporting member in a radial direction of the supporting member is prohibited. Therefore, the center of the supporting member is not displaced from the center of the valve seat in the radial direction. Accordingly, the displacement of the shaft in the radial direction can be prevented. Therefore, the valve element is certainly seated on the valve seat, and the valve leakage is prevented.

21 Claims, 12 Drawing Sheets

FLOW CONTROL VALVE FOR REDUCING VALVE LEAKAGE

CROSS REFERENCE TO RELATED APPLICATIONS

This application is based upon and claims priority from Japanese patent application Nos. Hei 9-199559, filed Jul. 25, 1997, Hei 10-119168, filed Apr. 28, 1998, and Hei 10-119536, filed Apr. 28, 1998, the entire contents of which are incorporated herein by reference.

BACKGROUND OF THE INVENTION

1. Field of the Invention

The present invention relates to a flow control valve which controls a flow rate of fluid and which is preferably suitable for an idling engine speed control valve (ISCV) for controlling an air flow which bypasses a throttle valve during an idling of an engine.

2. Description of Related Art

One type of known flow control valve may cause a valve leakage at a gap between a valve element and a valve seat when the valve element is seated on the valve seat (when the valve is totally closed) because of dispersion regarding dimensional accuracy and assembly accuracy of each element and the like.

Another type of flow control valve may solve the above problem and may reduce the leakage. As shown in FIG. 1, such the flow control valve has a housing 100, an air passage 110 formed in the housing 100, a valve element 120 which opens and closes the air passage 110, and an electromagnetic actuator 130 and the like. A rubber seat valve 140 is attached to a valve seat on which the valve element 120 is seated. The valve element 120 is lifted from the seat valve 140 by an attractive force of the actuator 130 and opens the air passage 110 when current is supplied to a coil 150 installed in the actuator 130. The valve element 120 is pushed to the seat valve 140 by a spring force of a spring 160 and closes the air passage 110 when current is not supplied to a coil 150.

According to this type of flow control valve, the gap between the valve element 120 and the seat valve 140 may be avoided even if dispersion regarding dimensional accuracy and assembly accuracy of each element occurs, because the seat valve 140 is pushed by the valve element 120 and deforms elastically. Therefore, the leakage may be reduced.

However, if this type of flow control valve is applied to an idling engine speed control valve, the rubber seat valve 140 absorbs gasoline, oil and the like and swells as shown in FIG. 2 because such gasoline, oil or the like may be included in an air flow in the air passage 110. In this case, the position of the valve element 120 shifts to the actuator 130 (to the right in FIG. 1) when the air passage 110 is totally closed. Therefore, the spring force of the spring 160 in a valve closing direction increases, and a required amount of current for the coil 150 to lift the valve element 120 from the full-close position increases. Thus, a predetermined flow rate characteristic (solid line in FIG. 10) changes to the one as shown by the dotted line in FIG. 10.

Another known electromagnetic valve has a valve element which has a spherical seal surface (a surface to be contacted with a valve seat) to prevent a valve leakage caused by a valve element inclination. (See JP-U-4-27277.) According to this electromagnetic valve, a moving core for holding the valve element slides, keeping a contact with a guide portion. Therefore, a gap is formed between the guide portion and the moving core such that the moving core may slide with the contact. If the gap causes a displacement of the moving core in a radial direction for some reason, the center of the spherical seal surface is displaced from a shaft center which is the center of an opening of the valve seat. In this case, the seal surface of the valve element eccentrically contacts with the valve seat, and the valve closes imperfectly.

Furthermore, friction surfaces of the moving core or the guide portion may wear if the valve element is repeatedly seated on or detached from the valve seat. Such wear may cause an expansion of the gap between the guide portion and the moving core, and thereby the moving core is displaced in the radial direction and the center of the spherical seal surface is displaced from the shaft center which is the center of the opening of the valve seat. Therefore, the valve element may not be seated on the valve seat securely (without any gap), whereby valve leakage may result.

Another known flow control valve has been shown in FIG. 3B. A flow control valve 200 is mounted by being embedded in a recess 210 formed in a throttle body 290. The flow control valve 200 has a mounting flange 211. A packing 230 is located between the mounting flange 211 and a mounting surface 220 of the throttle body 290. As shown in FIG. 3A, the flow control valve 200 is screwed and fixed to the throttle body 290 by three screws 222 at the mounting flange 211.

It is desirable to reduce the mounting area of the flow control valve 200 for reducing the size of an engine to reduce the fuel consumption. As shown in FIG. 4, the inventors herein tried a method to screw and fix the flow control valve 200 to the throttle body 290 by one screw 222 at the mounting surface 211, by locating seal members (O-rings) 240 at outer periphery of a housing of the flow control valve 200 and removing the packing 230.

According to such method, tightening force K (FIG. 4) of the screw 222 is applied only at the periphery of the screw 222, and the tightening force K is not applied to the mounting flange 211 at the opposite to the screw 222. Accordingly, as shown in FIG. 5, the mounting flange 211 slid on the mounting surface 220 according to an oscillation in a direction of X, and an oscillation resonance Z, whose oscillation center is at the screw 222, was generated. Measurement data measured at point C in FIG. 5 showing the existence of the oscillation resonance are shown by chain line B in FIG. 16.

SUMMARY OF THE INVENTION

The present invention is made in light of the foregoing problems, and it is an object of the present invention to provide a flow control valve whose flow rate characteristic is not changed by gasoline, oil or the like, and which reduces the valve leakage when the valve is closed even after repeated operations.

It is another object of the present invention to provide a flow control valve which reduces its mounting area at an engine, and which prevents the oscillation resonance caused by the engine vibration.

According to the flow control valve of the present invention, a seating surface formed on a valve element to contact a valve seat when the valve is closed has a shape of a part of a hypothetical spherical surface having a spherical center of a supporting center located at a center of a supporting member. Therefore, the distance from the supporting center to the seating surface is kept constant, and the valve element can be seated at a periphery of the valve seat without a gap, even if the shaft is inclined. Thus, the valve leakage is reduced.

The supporting member supports a shaft connected to the valve element movable in an axial direction of the shaft. The supporting center is aligned with a center of the valve seat. Movement of the supporting member in a radial direction of the supporting member is prohibited. Therefore, the supporting center is not displaced from the center of the valve seat in the radial direction. Accordingly, the displacement of the shaft in the radial direction can be prevented. Therefore, the valve element is certainly seated on the valve seat, and valve leakage is prevented.

According to another aspect of the present invention, a mounting flange having a mounting hole, which is for connecting the flange and a supporting surface by a fastener, is formed on an outer periphery of a housing. At least three protrusions are formed on the flange for dispersing a fastening force of the fastener to the protrusions. Therefore, the fastening force of the fastener is applied to the supporting surface by dispersing the fastening force on the protrusions.

Therefore, the fastening force of the fastener does not concentrate in one point with using only one fastener. Accordingly, the mounting flange has only one mounting hole to securely fix the flow control valve to the supporting surface, and the area of the mounting flange is reduced compared to the related art which uses a plurality of fasteners.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
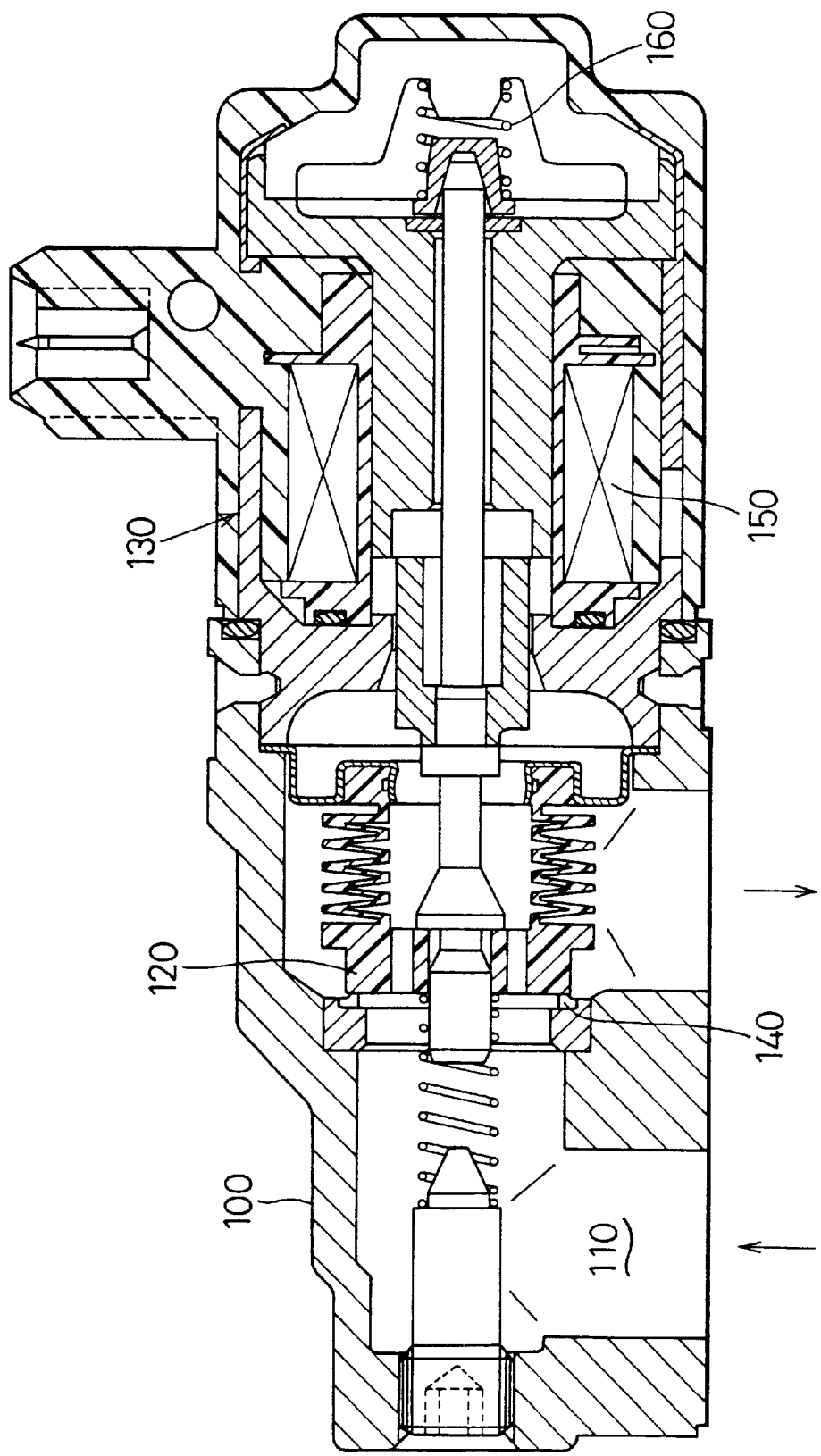
FIG. 1 is a sectional view of a flow control valve according to a related art.
Figure 2:
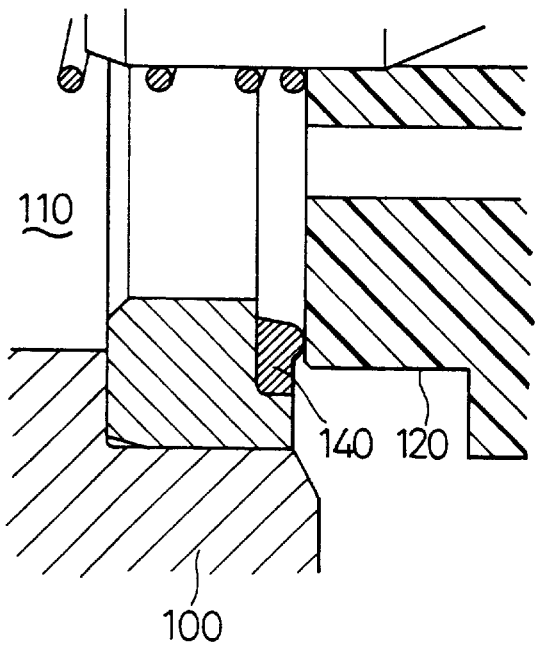
FIG. 2 is a part of an enlarged sectional view of FIG. 1 at the periphery of a valve element.
Figure 4:
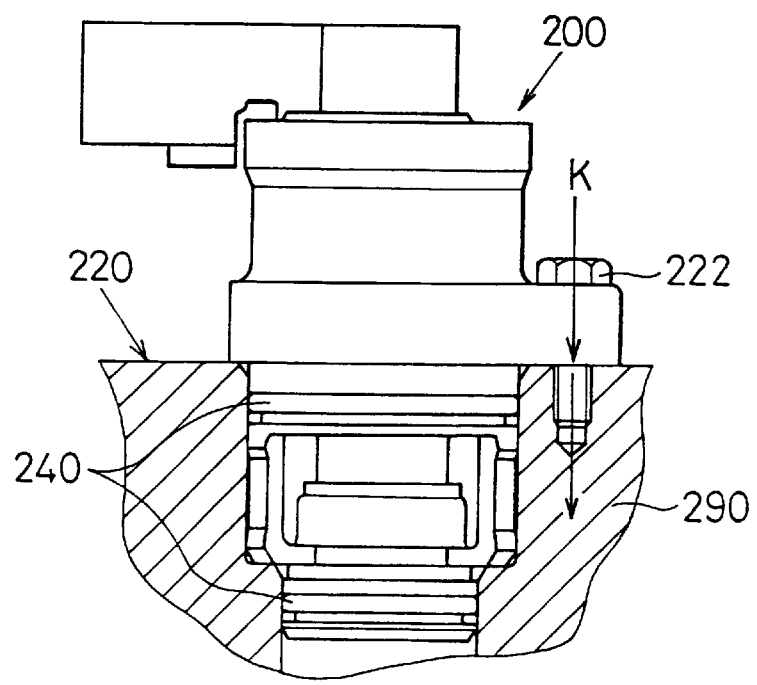
FIG. 4 is a side view of a flow control valve which is fixed by a screw at one point according to another related art.
Figure 3A:
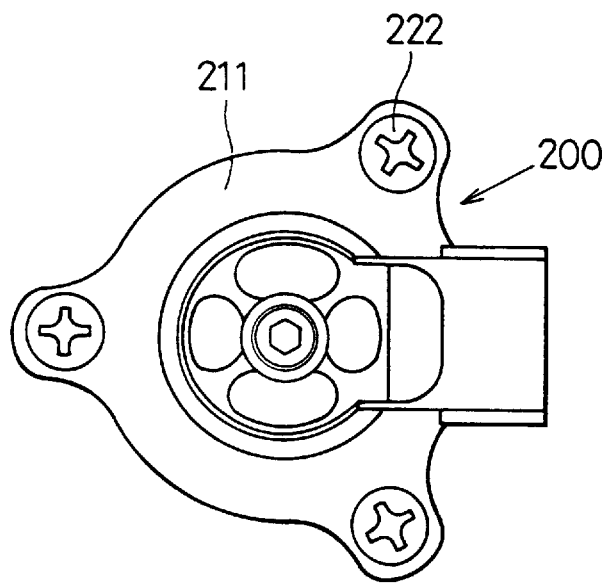
FIG. 3A is a top plan view of a flow control valve according to another related art.
Figure 3B:
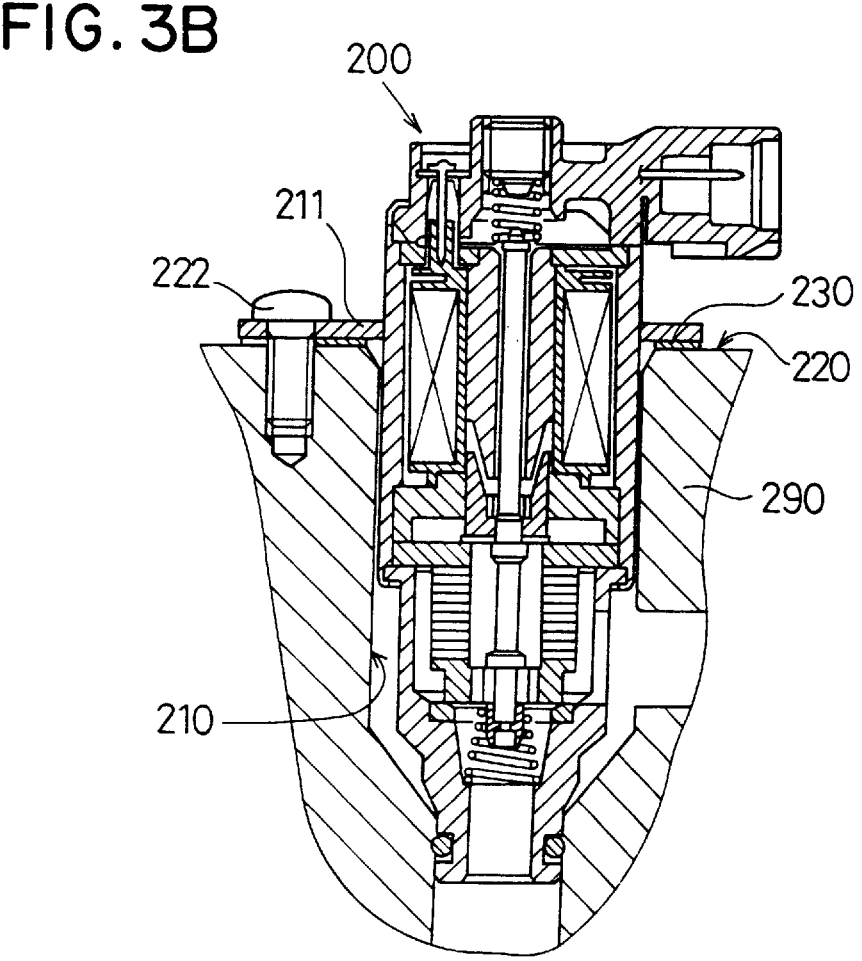
FIG. 3B is a part of a sectional view of the flow control valve shown in FIG. 3A.
Figure 5:
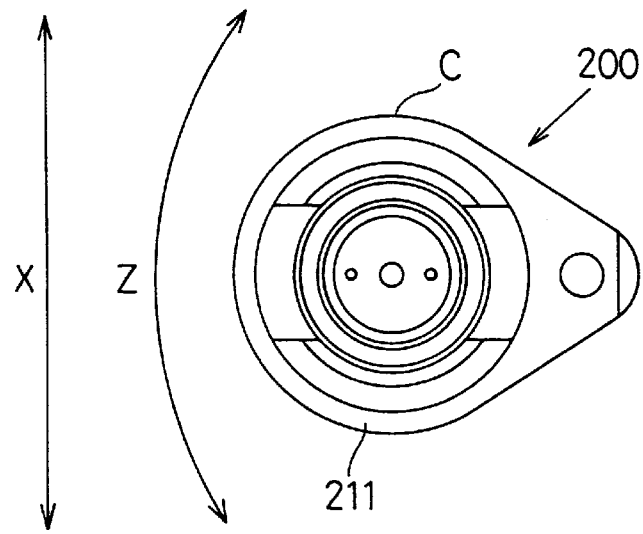
FIG. 5 is a bottom plan view of the flow control valve shown in FIG. 4.

Embodiments of the present invention will be described hereinafter with reference to the drawings.

First Embodiment

A first embodiment of the present invention is shown in FIGS. 6 through 11.

In the first embodiment, a flow control valve 1 is utilized as an idling engine speed control valve to control an air flow which bypasses a throttle valve (not shown) during an engine idling. The flow control valve 1 has a housing 3 with a bypass passage 2, a valve element 4 to close and open the bypass passage 2, a shaft 5 to support the valve element 4, and an electromagnetic actuator 6 to actuate the valve element 4 together with the shaft 5.

The housing 3 is made out of aluminum by die-casting, and is connected to the throttle body which is not shown in the drawings. An air intake port 2a and an air outlet port 2b of the bypass passage 2 is formed on a side of the housing 3. The air intake port 2a is connected to an air passage of the throttle body at upstream of the throttle valve. The air outlet port 2b is connected to the air passage of the throttle body downstream from the throttle valve.

The bypass passage 2 is formed in a U shape between the air intake port 2a and the air outlet port 2b. In the bypass passage 2, a seat member 7 (valve seat) on which the valve element 4 seats is formed in a pipe shape.

Figure 7:
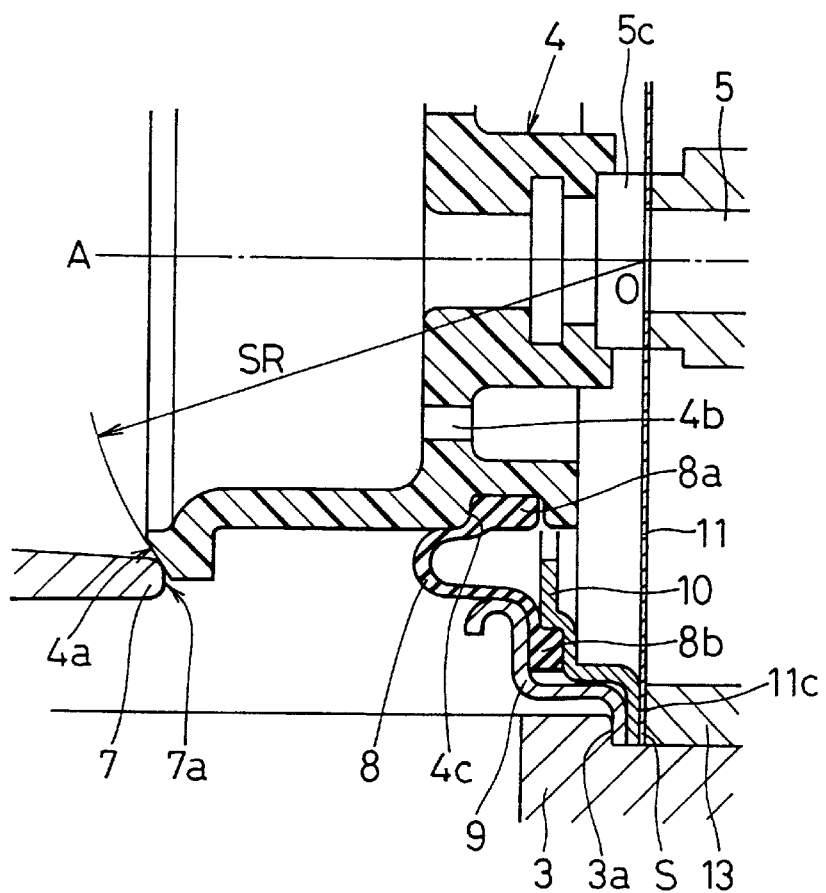
FIG. 7 is an enlarged sectional view of the periphery of a valve element shown in FIG. 6.
Figure 6:
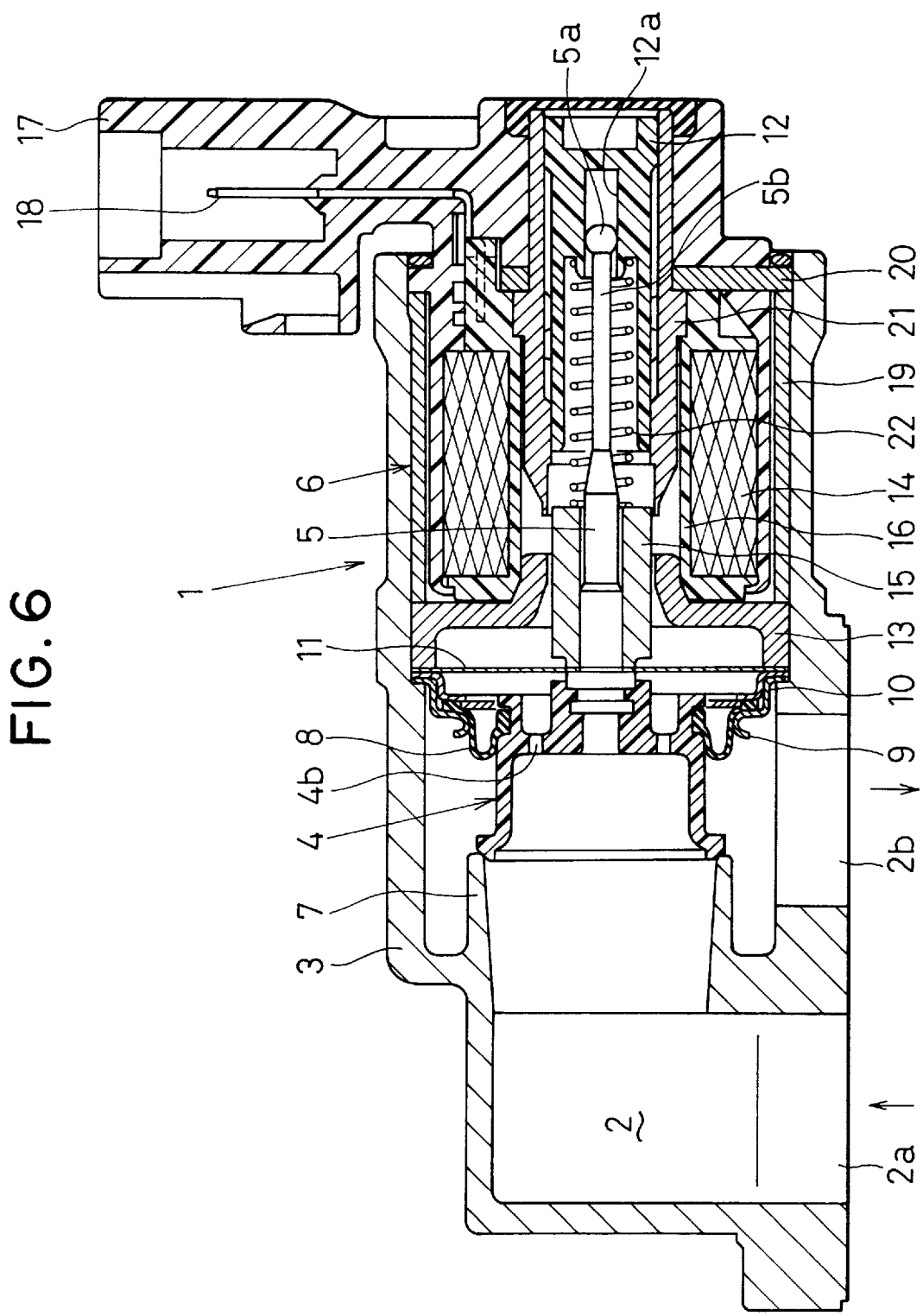
FIG. 6 is a sectional view of a flow control valve according to a first embodiment of the present invention.

As shown in FIG. 7, the seat member 7 has a tapered surface 7a which has a round shape such that the seat member 7 makes a line contact with a seating surface 4a of the valve element 4.

The valve element 4 is located to face the seat member 7 at a downstream side of the seat member 7. The valve element 4 is attached to an end of the shaft 5 (left in FIG. 6), and is capable of moving in the axial direction (to the left and right in FIG. 6) together with the shaft 5. In the first embodiment of the present invention, the left side of the flow control valve in FIG. 1 is referred as "front" or "front side", and the right side of the flow control valve in FIG. 1 is referred as "rear" or "rear side".

The valve element 4 is made out of resin or the like, and is formed in a pipe shape to correspond the pipe-shaped seat member 7. The front end of the valve element 4 (the seating surface 4a to be seated on the seat member 7) is formed to have a part of a hypothetical spherical surface having the radius SR from the center O as shown in FIG. 7. The valve element 4 also has plural through holes 4b to introduce the pressure at the front of the valve element 4 to the rear of the valve element 4 when the bypass passage 2 is closed by seating the valve element 4 on the seat member 7 (the state shown in FIG. 6).

A diaphragm 8 is installed in an outer periphery of the valve element 4 to cancel the atmospheric pressure applied to upper stream of the valve element 4 during the contact between the valve element 4 and the seat member 7. When the bypass passage 2 is closed by the valve element 4, the atmospheric pressure is applied to the upstream side of the valve element 4, and the negative pressure of intake pipe is applied to the downstream side of the valve element 4, and thereby a pressure difference is generated between the front and the rear of the valve element 4 and the rest point of the valve element 4 is affected. In order to resolve this problem, the diaphragm 8 is provided to cancel the pressure applied to the upstream side of the valve element 4 by introducing the atmospheric pressure to the rear side of the valve element 4 through the through holes 4b.

The diaphragm 8 is made of, for example, rubber. An inner bead 8a of the diaphragm 8 is latched and fixed to a ring-shaped recess 4c formed on an outer peripheral surface of the valve element 4. An outer bead 8b is held by being sandwiching between a first plate 9 and a second plate 10. Therefore, the diaphragm 8 is capable of stretching in the axial direction.

A front end of the shaft 5 is installed in the valve element 4 by an insert molding. The front end is supported by a plate spring 11, and a rear end 5a is inserted in a deep recess 12a formed in a center portion of an adjusting screw 12 (also referred to hereinbelow as a second supporting member) such that the rear end 5a is capable of sliding in the deep recess 12a. Therefore, the shaft 5 is movable in the axial direction with an elastic deformation of the plate spring 11. The rear end 5a has an approximate spherical shape, and has an outside diameter greater than the diameter of a shank 5b.

Figure 8:
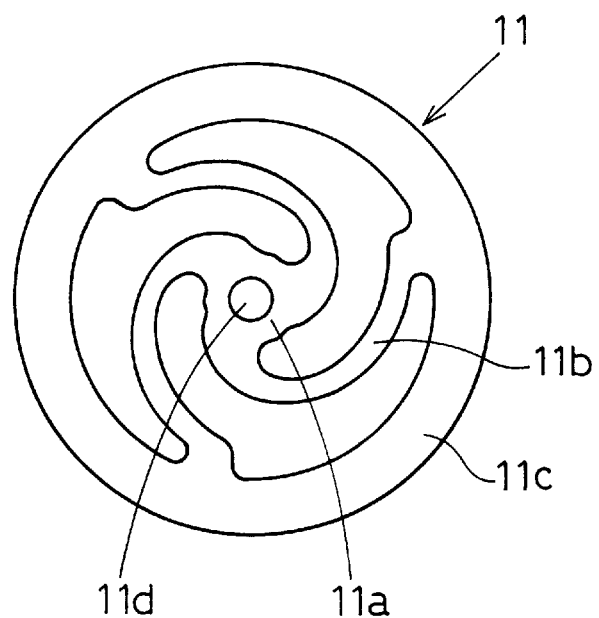
FIG. 8 is a plan view of a plate spring according to the first embodiment of the present invention.

As shown in FIG. 8, the plate spring 11, which is made out of stainless steel, has a supporting portion 11a to support the shaft 5, plural arm portions 11b which are extended outwardly in its radial direction from the supporting portion 11a, and a connecting portion 11c to connect outer ends of each arm portion 11b. A round hole 11d is formed at a center of the supporting portion 11a such that the shaft 5 is inserted in the round hole 11d. Each of the arm portions 11b has a spiral shape so that the arm portions 11b can bend between the connecting portion 11c and the supporting portion 11a. Thus, each of the arm portions 11b bends according to the movement of the shaft 5 in the axial direction because the total length of each one of the arm portions 11b is longer than the radius of the plate spring 11.

As shown in FIG. 7, a connecting portion 11c of the plate spring 11 is sandwiched, together with the first plate 9 and the second plate 10, between a step 3a of the housing 3 and a magnet plate 13 of the electromagnetic actuator 6 such that the supporting center O of the shaft 5 (the center of the round hole 11d) is aligned with the shaft center of the seat member 7 (shown by a chain line A in FIG. 7).

The outside diameter of the plate spring 11 is slightly smaller than the inside diameter of the housing 3 such that a gap S is formed between the outer periphery of the plate spring 11 and the inner periphery of the housing 3 as shown in FIG. 7.

The electromagnetic actuator 6 includes a solenoid coil 14 (hereinafter called "coil 14") whose current is controlled by an electronic control unit (ECU) which is not shown in the drawings, a magnetic circuit forming member (described hereinafter) to form a fixed magnetic circuit of the coil 14, and a moving core 15 which is fixed to the shaft 5.

The coil 14 is wound around the outside of a bobbin 16, and is connected to a terminal 18 which is molded in a connector 17 (made out of resin). The outside of the coil 14 is molded by resin with the connector 17.

The magnetic circuit forming member includes a pipe-shaped yoke 19 which is located outside of the coil 14, the magnet plate 13 which is adjacent to the front end of the yoke 19 and is located at the front side of the coil 14, a rear end plate 20 which is adjacent to the rear end of the yoke 19 and is located at the rear side of the coil 14, and a stator core 21 which has an approximate pipe shape and is located inside of the bobbin 16. Each element of the magnetic circuit forming member is made out of magnetic material, such as iron.

The moving core 15 is made out of magnetic material, such as iron, and is formed in a pipe shape. The moving core 15 is pressed in and fixed to the outer periphery of the shaft 5 at the rear side of the plate spring 11, and is biased toward the front side in the axial direction by a spring 22 which is located between the adjusting screw 12 and the moving core 15. The moving core 15 is attracted to the stator core 21 (to the right in FIG. 6) magnetized by the magnetic force of the coil 14 against the spring force of the spring 22 when a current is supplied to the coil 14, and moves together with the valve element 4 and the shaft 5.

The adjusting screw 12, which is made out of resin, is located in the stator core 21 and screwed in the stator core 21 for adjusting the set load of the spring 22. A certain set load is applied to the spring 22 by the adjusting screw 12 so that the valve element 4 can seat on the seat member 7 when the current is not supplied to the coil 14.

The assembling method for the flow control valve 1 is described as follows:

A. The inner bead 8a of the diaphragm 8 is latched in a recess 4c (see FIG. 7) which is formed on the outer surface of the valve element 4.

B. The outer bead 8b of the diaphragm 8 is sandwiched between the first plate 9 and the second plate 10.

C. The shaft 5 is inserted through the round hole 11d of the plate spring 11 from the rear side of the shaft 5. Then, the moving core 15 is pressed in the shaft 5 from the rear side of the shaft 5. Then, a valve subassembly is completed by sandwiching the plate spring 11 between the moving core 15 and a large radial portion 5c (see FIG. 7) of the shaft 5.

D. After locating the housing 3 by setting the rear side up and the front side down, the valve subassembly is dropped in the housing 3 from the valve element 4 side, and the valve element 4 is seated on the seat member 7. The weight W of the valve subassembly is applied to the contact between the tapered surface 7a and the seating surface 4a. The centripetal force F (a force toward the shaft center of the seat member 7) is applied to the valve element 4 according to the wedge effect of the weight of the valve subassembly because the tapered surface 7a is tapered and the seating surface 4a has the shape of a part of the hypothetical spherical surface.

Figure 9:
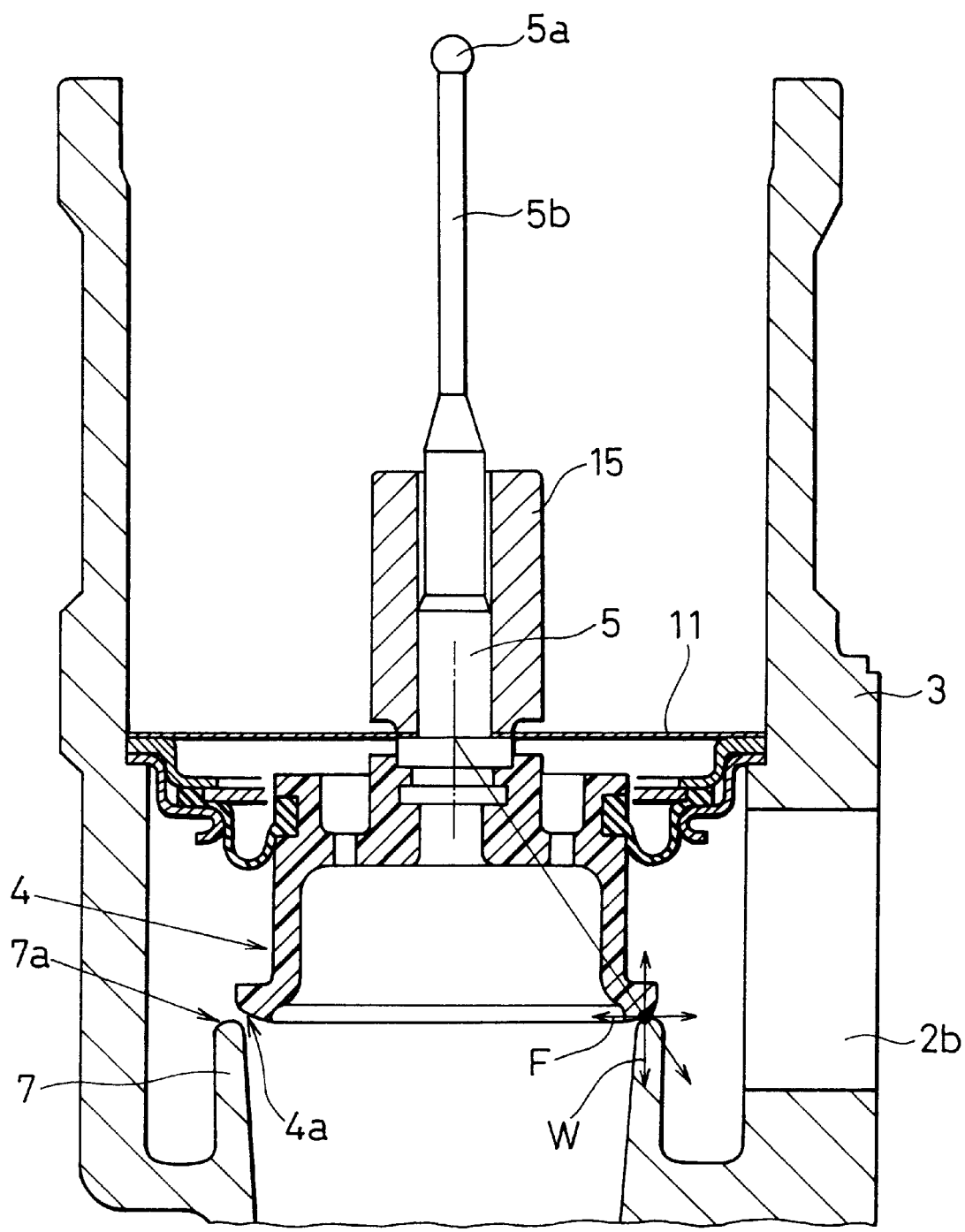
FIG. 9 is a part of sectional view of the flow control valve to show an assembling process for a valve subassembly according to the first embodiment of the present invention.

As shown in FIG. 9, even if the center of the valve subassembly is displaced from the shaft center of the seat member 7 when the valve subassembly is dropped in the housing 3, the center of the valve subassembly is selfmatched to the shaft center of the seat member 7 by the centripetal force F, and thereby the center of the valve subassembly is aligned to the shaft center of the seat member 7.

The first plate 9 and the second plate 10 are fixed by pressing the magnet plate 13 in the housing 3 with keeping the state that the outer periphery of the plates 9, 10 contact the inner periphery of the housing 3 (see FIG. 7). However, the first and second plates 9, 10 do not prevent the valve subassembly from the self-matching because the diaphragm 8 is made out of rubber which has very low rigidity. Furthermore, since the gap S is provided between the plate spring 11 and the housing 3, the plate spring 11 has no interference with the housing 3 when the valve subassembly is dropped in the housing 3, and the valve subassembly is not prevented from the self-matching.

E. After completing the self-matching of the valve subassembly, each outer periphery of the first plate 9, the second plate 10 and the plate spring 11 is sandwiched and held by pressing the magnet plate 13 in the housing 3.

F. Each component of the electromagnetic actuator 6 other than the magnet plate 13 is assembled in the housing 3.

The operation of the first embodiment of the present invention will be described below.

When the current is supplied to the coil 14 through the electronic control unit, a magnetic circuit is formed through the magnetic circuit forming member (the yoke 19, the magnet plate 13, the rear end plate 20, and the stator core 21) and the moving core 15. Therefore, an attractive force is generated between the stator core 21 and the moving core 15. According to this attractive force, the moving core 15 is attracted toward the stator core 21 to a position that each elastic force of the spring 22 and the plate spring 11 is balanced each other. Thus, the shaft 5 and the valve element 4 move together with the moving core 15 to the rear side in the axial direction.

Figure 10:
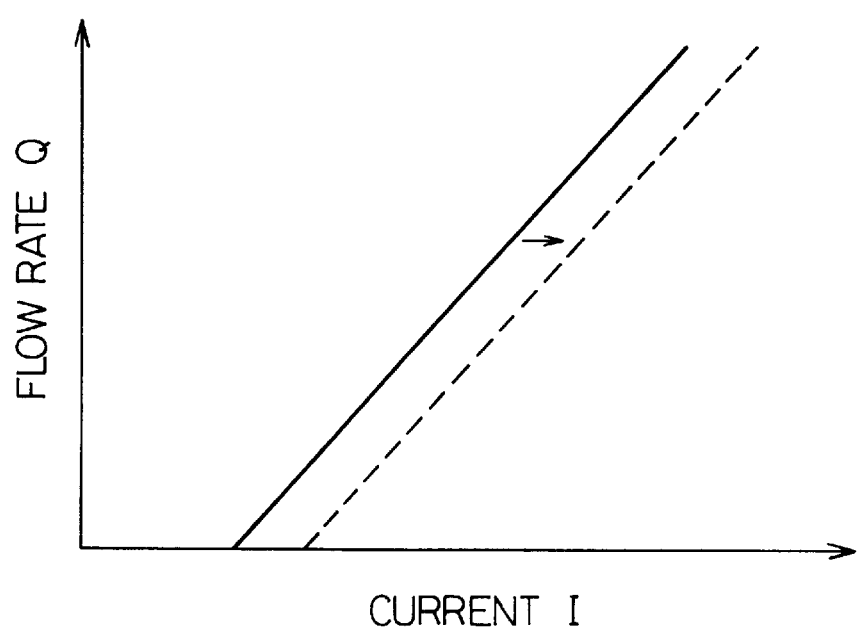
FIG. 10 is a graph showing a flow rate characteristic.

Therefore, the bypass passage 2 is opened because the seating surface 4a of the valve element 4 is lifted from the seat member 7, and air flows in the bypass passage 2 from the air intake port 2a toward the air outlet port 2b. As shown in FIG. 10 by the solid line, the air flow rate Q in the bypass passage 2 changes according to the current value I which is supplied to the coil 14. In other words, the air flow rate Q in the bypass passage 2 can be controlled by controlling the current supply to the coil 14 and adjusting the lift distance of the valve element 4 because the attractive force generated between the stator core 21 and the moving core 15 changes in proportion to the current value I which is supplied to the coil 14.

When the current supply to the coil 14 is stopped, the attractive force of the actuator 6 disappears, and the moving core 15 is returned to the front side by the spring force of the spring 22. As a result, the valve element 4 and the shaft 5 move toward the front side together with the moving core 15, and the seating surface 4a of the valve element 4 contacts the seat member 7 to close the bypass passage 2.

According to the first embodiment of the present invention, the seating surface 4a of the valve element 4 is formed on the hypothetical spherical surface having the radius SR from the supporting center O. Therefore, the distance from the supporting center O of the shaft 5 to the seating surface 4a is kept constant, and the valve element 4 can be seated at all periphery of the seat member 7 without a gap, even if the shaft 5 is inclined by the dispersion regarding dimensional accuracy and assembly accuracy of each element and the like (however, the supporting center O of the shaft 5 is on the shaft center A of the seat member 7, and the rear end of the shaft 5 is displaced from the shaft center A of the seat member 7). Thus, the valve leakage is reduced.

Furthermore, the supporting center O of the plate spring 11 is not displaced from the shaft center A of the seat member 7 in the radial direction because the valve subassembly is fixed in the centered state against the seat member 7. Accordingly, the displacement of the shaft 5 in the radial direction can be prevented. Therefore, the valve element 4 is certainly seated on the valve seat, and the valve leakage is prevented.

According to the first embodiment of the present invention, the installation of the rubber seat valve is not required. Therefore, the flow rate characteristic change caused by the change of the shape (swelling) of the seat valve is prevented, and the number of the elements is reduced.

Figure 11A:
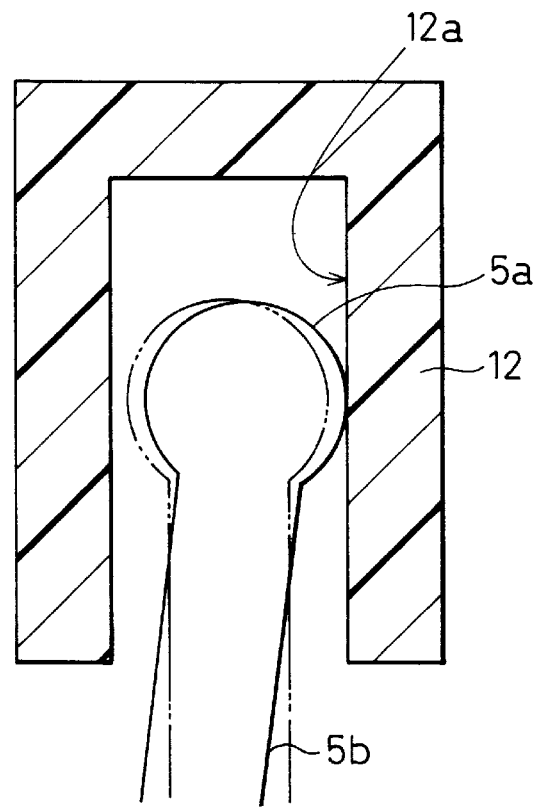
FIG. 11A is a part-enlarged sectional view showing an inclined state of a shaft according to the first embodiment of the present invention.
Figure 11B:
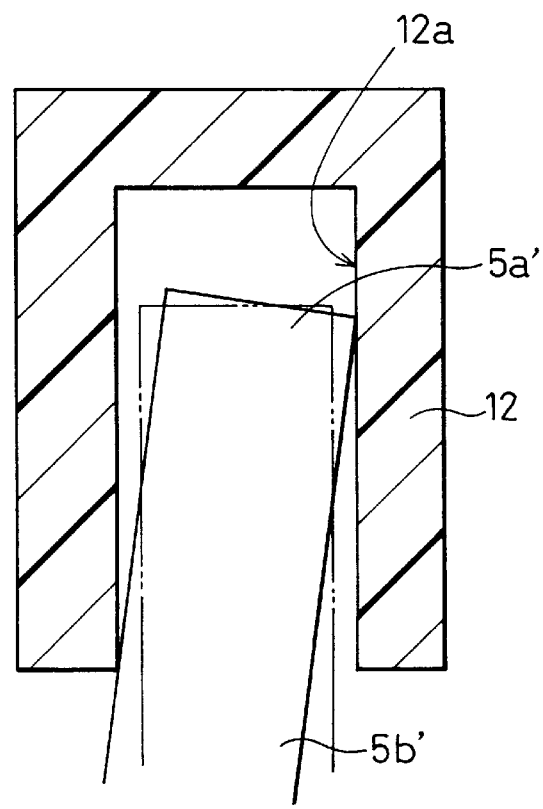
FIG. 11B is a schematic view to explain an advantage of the first embodiment of the present invention.

Furthermore, the rear end 5a, which is inserted in the deep recess 12a, of the shaft 5 has an approximate spherical shape, and has an outside diameter greater than the diameter of a shank 5b according to the first embodiment. Therefore, the shank 5b does not make a contact with the adjusting screw 12 even if the shaft 5 inclines as shown in FIG. 11A, and only one point of the rear end 5a makes a contact with the adjusting screw 12 (inner periphery surface of the deep recess 12a). If the shaft 5 does not have the spherical-shaped rear end 5a and an outside diameter of a shank 5b' has the same diameter of a rear end 5a', one point of the rear end 5a' and another point of the shank 5b' make a contact with the adjusting screw 12 as shown in FIG. 11B. According to the first embodiment of the present invention, even if the shaft slides with the inclined state, the friction resistance between the shaft 5 and the adjusting screw 12 is reduced compared with the one shown in FIG. 11B. Therefore, the hysteresis (difference between a flow rate when the shaft 5 is driven in a valve-open direction and a flow rate when the shaft 5 is driven in a valve-close direction) of the flow characteristic is suppressed.

Second Embodiment

A second embodiment of the present invention is shown in FIGS. 12 through 19.

Figure 13:
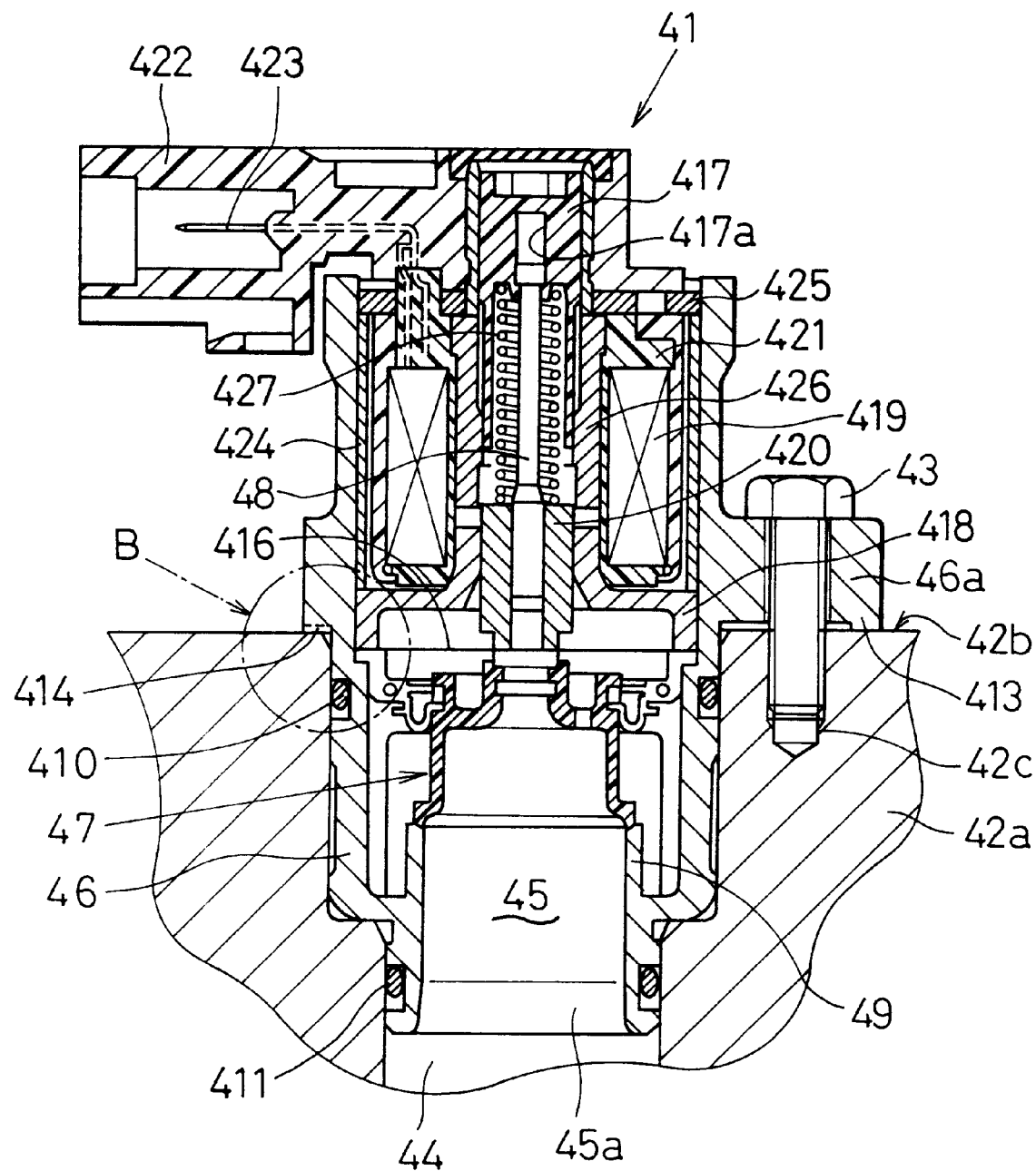
FIG. 13 is a longitudinal sectional view of the flow control valve taken along line XIII—XIII of FIG. 12 according to the second embodiment of the present invention.

In the second embodiment, a flow control valve 41 is utilized as an idling engine speed control valve for controlling an air flow which bypasses a throttle valve (not shown) during an idling of an engine. As shown in FIG. 13, the lower portion of the flow control valve 41 is buried in a throttle body 42, and the flow control valve 41 is installed and fixed to the throttle body 42 with a screw 43.

Figure 15:
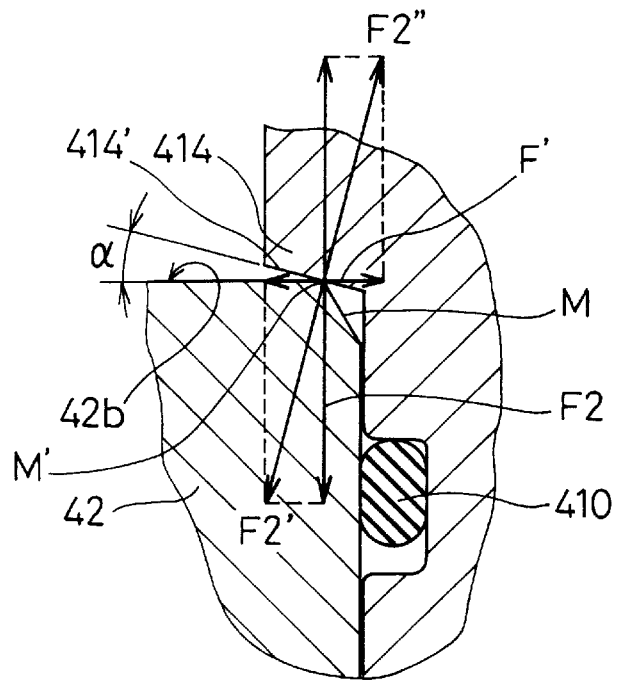
FIG. 15 is an enlarged view of a portion B in FIG. 13 according to the second embodiment of the present invention.

An installation hole 42a is formed in the throttle body 42 for the installation of the flow control valve 41. The installation hole 42a is connected to a bypass passage 44 which bypasses the throttle valve. As shown in FIG. 15, a chamfer M is formed at the periphery of the opening of the installation hole 42a. The flow control valve 41 includes a housing 46 to form an air passage 45, a valve element 47 to open and close the air passage 45, a shaft 48 to support the valve element 47, and an electromagnetic actuator (described below) to actuate the valve element 7 together with the shaft 48.

The housing 46 is made out of aluminum by die-casting, and has an approximate pipe shape. The mounting flange 46a for mounting the housing 46 on the throttle body 42 is formed at an approximate center of the longitudinal direction (vertical direction in FIG. 13) of the housing 46. A part of the housing beneath the mounting flange 46a is assembled in the installation hole 42a.

Figure 14:
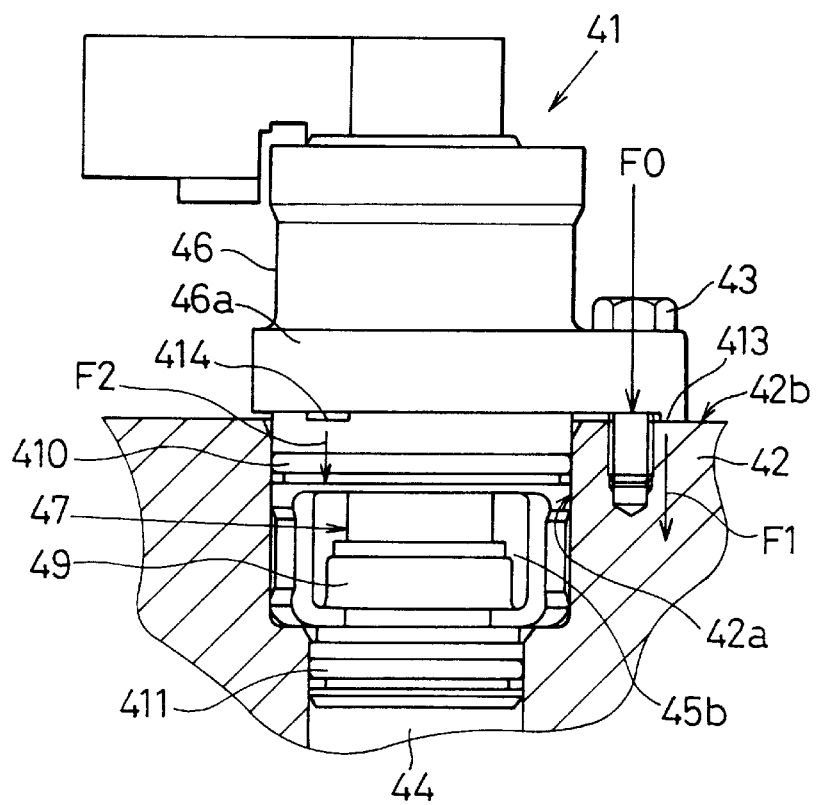
FIG. 14 is a side view of the flow control valve according to the second embodiment of the present invention.

Beneath the mounting flange 46a, an intake port 45a of the air passage 45 is located at the lower end of the housing 46, and an outlet port 45b of the air passage 45 is located at the outer periphery of the housing 46 as shown in FIGS. 13 and 14. Therefore, the air passage 45 inside the housing 46 is connected to the bypass passage 44 through the intake port 45a and the outlet port 45b. A seat member 49 (valve seat), on which the valve element 47 is seated when the air passage 45 is closed, is formed inside the housing 46 in the shape of a pipe.

Seal members 410, 411 (for example, O-rings) are located between the installation hole 42a and the housing 46 to seal hermetically at the intake port 45a and the outlet port 45b, respectively.

Figure 12:
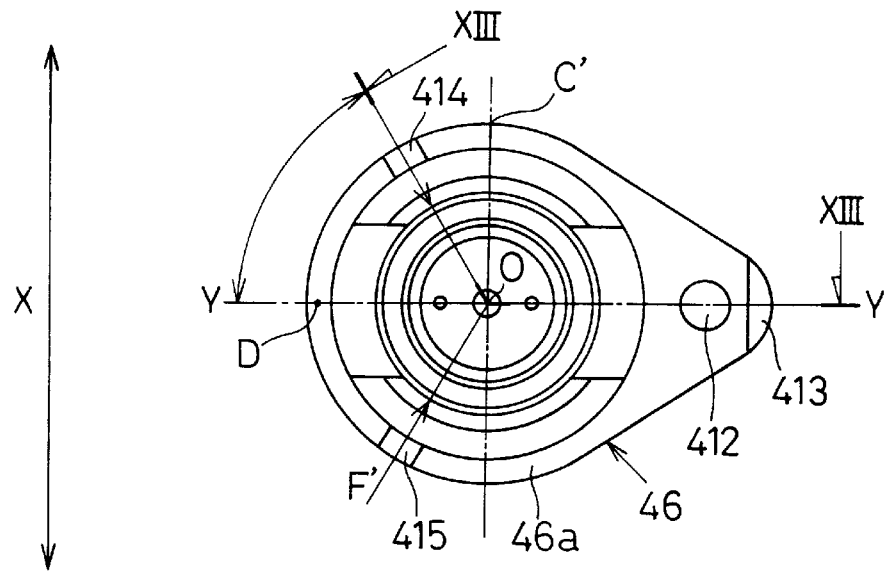
FIG. 12 is a bottom plan view of a flow control valve which is viewed from a throttle body according to a second embodiment of the present invention.

As shown in FIG. 12, the mounting flange 46a has an approximate ring shape which protrudes outward over the circumference of the housing 46. The mounting flange 46a has a mounting hole 412 for a screw 43. Three protrusions (hereinafter referred to as first protrusion 413, second protrusion 414, and third protrusion 415) are formed downward on a bottom surface of the mounting flange 46a. One purpose of these protrusions 413, 414, 415 is to define the location of the flow control valve 41 in a direction of depth of the installation hole 42a by contacting a throttle body surface 42b (corresponding to the supporting surface of the engine side in the appended claims) around the circumferential periphery of the installation hole 42a when the lower portion of the flow control valve 41 is assembled into the installation hole 42a of the throttle body 42. Another purpose of these protrusions 413, 414, 415 is to apply the tightening force of the screw 43 to the throttle body surface 42b via the protrusions 413, 414, 415.

As shown in FIG. 12, the first protrusion 413 is located outside the center of the mounting hole 412 on the radial direction which lies on the shaft center O of the flow control valve 41 and the center of the mounting hole 412. The second protrusion 414 and the third protrusion 415 are located at both sides of a hypothetical line Y—Y which lies on the center of the mounting hole 412, and are located between 5° and 160° of a mounting angle. Locating the protrusions 413, 414, 415 based on the first protrusion 413 with approximate the same mounting angles between them as shown in FIG. 12 is preferable. The mounting angle is defined as an angle between the point D of the mounting flange 46a on the hypothetical line Y—Y and the second protrusion 414 or the third protrusion 415, with the shaft center O of the flow control valve 41.

As shown in FIG. 15, each of the second and third protrusions 414, 415 has tapered bottom surfaces 414', 415', respectively, with a tapered angle α (hereinafter called "pressure angle α"). The bottom surfaces 414', 415' are inclined to certain degree (pressure angle α) from the throttle body surface 2b. An upper end M' (corner) of the chamfer M is making a line contact with the bottom surfaces 414', 415' (slopes) on its circumference.

The valve element 47 faces the seat member 49 downstream of the seat member 49 in the housing 46, and is fixed to the front end of the shaft 48 so that the valve 47 can move with the shaft 48 in the axial direction (longitudinal direction in FIG. 14).

The bottom end of the shaft 48 is supported by a leaf spring 416, and the upper end of the shaft 48 is inserted in a hollow 417a of an adjusting screw 417 such that the shaft 48 can slide in the hollow 417a. Therefore, the shaft 48 can move in the axial direction with the deformation of the leaf spring 416.

The leaf spring 416 is installed such that it can deform elastically in the axial direction. The outer circumferential periphery of the leaf spring 416 is held between an inner wall of the housing 46 and a magnet plate 418 which is a part of the electromagnetic actuator, under the condition that the support center of the shaft 48 is aligned with the shaft center of the seat member 49.

The electromagnetic actuator includes a solenoid coil 419 (hereinafter referred to as "coil 419") whose current is controlled by an electronic control unit (not shown), a magnetic circuit forming member (described hereinafter) to form a fixed magnetic circuit of the coil 419, and a moving core 420 which is fixed to the shaft 48.

The coil 419 is wound around the outside of a bobbin 421, and is connected to a terminal 423 which is molded in a connector 422 made out of resin.

The magnetic circuit forming member includes a pipe-shaped yoke 424 which is located outside of the coil 419, the magnet plate 418 which is adjacent to the lower end of the yoke 424 and is located at the lower side of the coil 419, an upper plate 425 which is adjacent to the upper surface of the yoke 424 and is located on the upper portion of the coil 419, and a stator core 426 which has an approximate pipe shape and is located inside of the bobbin 421. Each element of the magnetic circuit forming member is made out of magnetic material, such as iron.

The moving core 420 is made out of magnetic material, such as iron, and is formed in a pipe shape. The moving core 420 is pressed in and fixed to the outer periphery of the shaft 48 at the upper side of the leaf spring 416, and is biased downward in the axial direction by a spring 427 which is located between the adjusting screw 417 and the moving core 420. The moving core 420 is attracted to the stator core 426 (to the upper side in FIG. 13) magnetized by the magnetic force of the coil 419 against the spring force of the spring 427 when a current is supplied to the coil 419, and moves together with the valve element 47 and the shaft 48.

The adjusting screw 417 is located in the stator core 426 and screwed in the stator core 426 for adjusting the set load of the spring 427.

The operation of the flow control valve 41 will be described below.

When the current is supplied to the coil 419 through the electronic control unit, a magnetic circuit is formed through the magnetic circuit forming member and the moving core 420. Therefore, an attractive force is generated between the stator core 426 and the moving core 420. According to this attractive force, the moving core 420 is attracted toward the stator core 426 to a position that each elastic force of the spring 427 and the leaf spring 416 is balanced each other. Thus, the shaft 48 and the valve element 47 move together with the moving core 420 toward the upper side in the axial direction.

As a result, the air passage 45 is opened because the valve element 47 is lifted from the seat member 49, and air (air which bypasses the throttle valve) flows in the air passage 45 from the air intake port 45a toward the air outlet port 45b of the housing 46.

When the current supply to the coil 419 is stopped, the attractive force disappears and the moving core 420 is returned to the lower side by the spring force of the spring 427. As a result, the valve element 47 and the shaft 48 move downward together with the moving core 420, and the valve element 47 contacts the seat member 49 to close the air passage 45.

The installation method (fixing method) of the flow control valve 41 on the throttle body 42 will be described below.

First, the lower portion of the flow control valve 41 is inserted in the installation hole 42a of the throttle body 42 after attaching the seal members 410, 411 to the outer periphery of the housing 46. The location of the flow control valve 41 in a direction of the depth of the installation hole 42a is determined by contacting the protrusions 413, 414, 415 to the throttle body surface 42b.

Second, the screw 43 is inserted through the mounting hole 412 and is screwed on a threaded hole 42c (see FIG. 13) formed on the throttle body 42 to generate the tightening force. This tightening force is applied to the throttle body surface 42b via the protrusions 413, 414, 415.

As shown in FIG. 15, each of the second and third protrusions 414 and 415 has the tapered bottom surfaces 414' and 415' respectively with the pressure angle α between the throttle body surface 42b and the tapered bottom surface 414' (415'). Therefore, when a component force F2 is applied to the throttle body surface 42b via the second and third protrusions 414 and 415, the component force F2 is amplified to a force F2' which is perpendicular to the tapered bottom surface 414' (415'). A component force F' (centripetal force), which is a radial component force of a reaction force F2" against the force F2', in the radial direction toward the shaft center of the flow control valve 41 is generated. The centripetal force F' functions effectively to suppress the oscillation resonance of the flow control valve 41 caused by the engine vibration.

According to the flow control valve 41 of the second embodiment of the present invention, the tightening force of the screw 43 is applied to the throttle body surface 42b by dispersing the tightening force on the first through third protrusions 413, 414, 415 formed at the mounting flange 46a. Therefore, the tightening force of the screw 43 does not concentrate in one point, and the similar result, which is achieved when the flow control valve 41 is fixed by using three screws, is achieved. Accordingly, the mounting flange 46a has only one mounting hole 412. Therefore, the area of the mounting flange 46a is reduced compared with the related art which has three screws to fix the flow control valve. Thus, the size of the engine is also reduced. Furthermore, the manpower for screwing is reduced, and thereby the cost for manufacturing is reduced, because only one screw is required.

Figure 16:
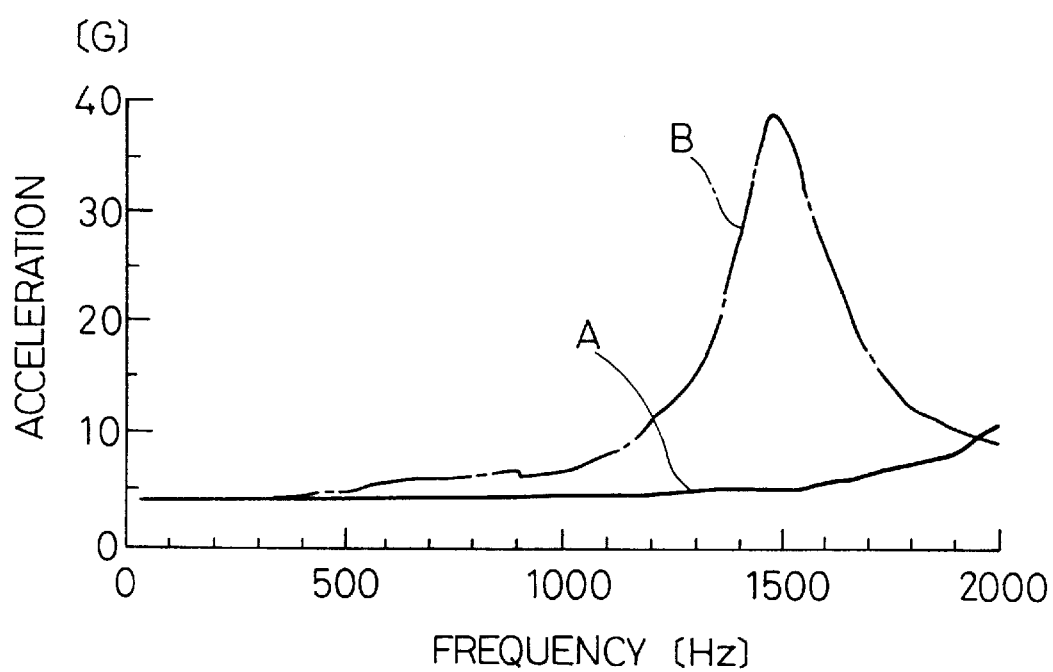
FIG. 16 is a graph showing measurement data measured to show the existence and nonexistence of the oscillation resonance.

Furthermore, the second and third protrusions 414 and 415 has the tapered bottom surfaces 414' and 415' respectively with the pressure angle α between the throttle body surface 42b and the tapered bottom surface 414' (415'). Therefore, when the tightening force is applied to the throttle body surface 42b via the second and third protrusions 414 and 415, the centripetal force F' toward the shaft center of the flow control valve 41 is generated. This centripetal force F' has a component force against the engine vibration component in the direction of the arrow X in FIG. 12. Therefore, the oscillation resonance of the flow control valve 41 caused by the engine vibration is suppressed effectively by the centripetal force F'. Solid line A in FIG. 16 shows measurement data measured at the point C' of the mounting flange 46a in FIG. 12 to show the nonexistence of the oscillation resonance according to the second embodiment of the present invention.

Figure 17:
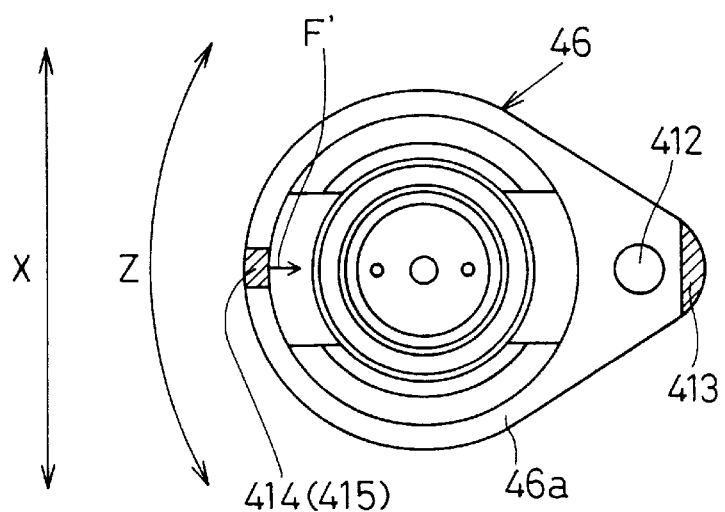
FIG. 17 is a bottom plan view of the flow control valve to show centripetal force when a pressure angle of remaining protrusions is 0° according to the second embodiment of the present invention.
Figure 18:
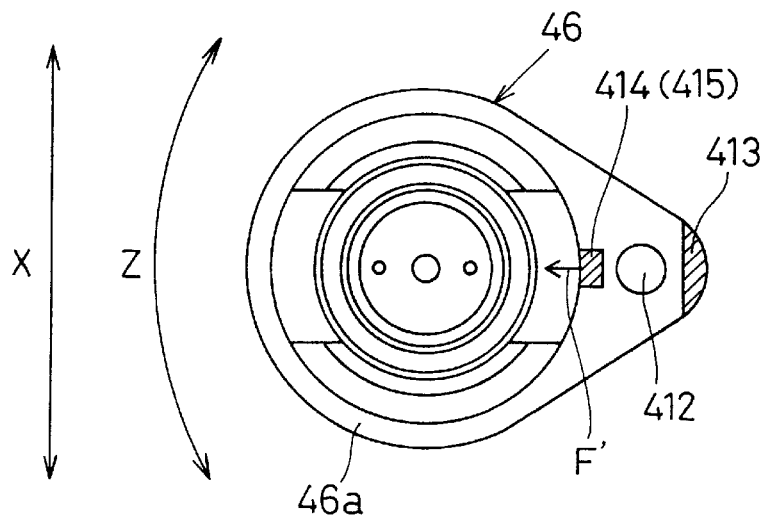
FIG. 18 is a bottom plan view of the flow control valve to show centripetal force when the pressure angle of remaining protrusions is 180° according to the second embodiment of the present invention.

If the mounting angle is smaller than 5° as shown in FIG. 17 or greater than 160° as shown in FIG. 18, the centripetal force F' is approximately perpendicular to the engine vibration in the direction of the arrow X. Therefore, there is little suppression of the oscillation resonance in this case.

According to the second embodiment of the present invention, the second protrusion 414 and the third protrusion 415 can be formed adjacent to the outside periphery of the housing 46 because the seal members 410, 411 are attached to the outer periphery of the housing 46. In other words, the need for a seal member, such as a packing, between the first through third protrusions 413, 414, 415 and the throttle body surface 42b is obviated. Therefore, the space for the seal at the mounting flange as shown in the related art is obviated, and the mounting area of the mounting flange 46a is further reduced.

In the second embodiment, the number of the protrusions at the mounting flange 46a is not only limited to three but also more than three. However, one of these protrusions is required to be located outside the center of the mounting hole 412 on the radial direction which lies on the shaft center O of the flow control valve 41 and the center of the mounting hole 412, such that the principle of lever can be applied in order to disperse the tightening force of the screw 43 to the protrusions.

Figure 19:
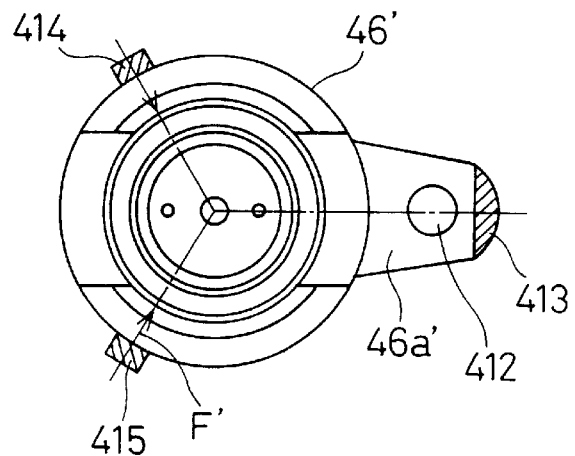
FIG. 19 is a bottom plan view of a modified application of the flow control valve according to the second embodiment of the present invention.

As shown in FIG. 19, the mounting flange 46a may be omitted, and a housing 46' and a mounting flange 46a' may be formed such that there is no flange between the protrusions 413, 414, 415 except the mounting flange 46'.

The second embodiment of the present invention may be applicable not only to the flow control valve whose lower portion is installed in the installation hole 42a, but also to a flow control valve which is located outside the throttle body 42 in its entirety.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A flow control valve comprising:
   a housing having a passage;
   a valve seat installed in the passage and having a ring shape;
   a valve element for closing the passage when the valve element is seated on the valve seat, and for opening the passage when the valve element is spaced from the valve seat;
   a shaft connected to the valve element for movement therewith; and
   a supporting member for supporting the shaft at a center of the supporting member, wherein
   said supporting member is fixed in the housing in such a manner that the center of the supporting member is aligned with a center of the valve seat;
   said supporting member supports the shaft such that the shaft is movable in an axial direction of the shaft; and
   said valve element has a seating surface for contacting the valve seat when the valve element is seated on the valve seat, such that the seating surface has a shape of a part of a hypothetical spherical surface having a spherical center on the center of the supporting member.

2. A flow control valve according to claim 1, further comprising:
   a first holding member formed in an inner circumference of the housing;
   a second holding member facing the first holding member; wherein:
   an outer circumference of the supporting member is sandwiched and held between the first holding member and the second holding member such that at least a part of the outer circumference of the supporting member has a gap between the housing and the supporting member in the radial direction.

3. A flow control valve according to claim 2, further comprising:
   a first plate held between the first holding member and the second holding member;
   a second plate held between the first holding member and the second holding member; and
   a diaphragm having a first end and a second end, said first end is connected to the valve element, and said second end is held between said first plate and said second plate.

4. A flow control valve according to claim 1, wherein;
   said supporting member includes a plate spring, said plate spring comprising:
      a shaft supporting portion being located around the center of the supporting member for supporting the shaft; and
      a plurality of arm portions radially extended from said shaft supporting portion such that a length from the shaft supporting portion to an outer end of the arm portion along the arm portion is longer than a radial distance from the shaft supporting portion to the outer end of the arm portion.

5. A flow control valve according to claim 1, wherein;
   said valve seat comprises a tapered portion for making a line contact with the valve element when the valve element is seated on the valve seat.

6. A flow control valve according to claim 1, further comprising:
   a second supporting member for supporting the shaft so that a proximal end of the shaft is movable in the axial direction, wherein
      the proximal end of the shaft has a spherical shape whose outer diameter is greater than an outer diameter of an adjacent, more distal portion of said shaft.

7. A flow control valve according to claim 1, wherein said flow control valve controls an air flow which bypasses a throttle valve during engine idling.

8. A flow control valve according to claim 1, further comprising:
   a securing member formed on an outer periphery of the housing, and having a mounting hole defined therethrough for receiving a fastener for mounting the housing on a supporting surface of an object for said flow control valve to be mounted with a tightening force; and
   at least three axial protrusions formed on the outer periphery of the housing for dispersing said tightening force to said protrusions.

9. A flow control valve according to claim 8, wherein;
   one of said protrusions is located radially outwardly of the mounting hole with respect to a center of the housing, and each of the other protrusions is located at a respective side of a hypothetical line, which passes through the center of the housing and a center of the mounting hole, at a respective mounting angle between 5° and 160° formed between the hypothetical line and the respective protrusion.

10. A flow control valve according to claim 9, wherein;
    said each of other protrusions has a tapered surface so that a centripetal force toward the center of the housing is generated by the tightening force.

11. A flow control valve according to claim 10, wherein said housing includes:
    a first seal member formed on an outside circumferential periphery of the housing at a downstream side of the valve seat; and
    a second seal member formed on the outside circumferential periphery of the housing at an upstream side of the valve seat.

12. A flow control valve according to claim 1, further comprising:
    an electromagnetic actuator including a coil, a pipe-shaped moving core fixed to said shaft, and stator members facing a circumferential surface and an end surface of said moving core.

13. A flow control valve comprising:
    a housing having a passage;
    a valve seat installed in the passage and having a ring shape, and having a tapered portion;
    a valve element for closing the passage when the valve element is seated on the valve seat, and for opening the passage when the valve element is spaced from the valve seat;
    a shaft connected to the valve element for movement therewith;
    a supporting member for supporting the shaft at a center of the supporting member, wherein
       said supporting member supports the shaft such that the shaft is movable in an axial direction of the shaft;
       said valve element has a seating surface, having a shape of a part of a hypothetical spherical surface having a spherical center on the center of the supporting member, for contacting the valve seat such that said center of the supporting member is aligned with a center of the valve seat when the valve element is seated on the valve seat.

14. A flow control valve according to claim 13, further comprising:
    a first holding member formed in an inner circumference of the housing;
    a second holding member facing the first holding member; wherein:
       an outer circumference of the supporting member is sandwiched and held between the first holding member and the second holding member such that at least a part of the outer circumference of the supporting member has a gap between the housing and the supporting member in the radial direction.

15. A flow control valve according to claim 14, further comprising:
    a first plate held between the first holding member and the second holding member;
    a second plate held between the first holding member and the second holding member; and
    a diaphragm having a first end and a second end, said first end is connected to the valve element, and said second end is held between said first plate and said second plate.

16. A flow control valve according to claim 13, wherein;
    said supporting member includes a plate spring further comprising:
       a shaft supporting portions being located around the center of the supporting member for supporting the shaft; and
       a plurality of arm portion radially extended outwardly from said shaft supporting portion such that a length from the shaft supporting portion to an outer end of the arm portion along the arm portion is longer than a radial distance from the shaft supporting portion to the outer end of the arm portion.

17. A flow control valve according to claim 13, further comprising:
a second supporting member for supporting the shaft so that a proximal end of the shaft is movable in the axial direction, wherein
said shaft includes a shaft portion connected to said proximal end of the shaft; and
said proximal end of the shaft has a spherical shape whose outer diameter is greater than an outer diameter of said shaft portion.

18. A flow control valve according to claim 13, further comprising:
an electromagnetic actuator including a coil, a pipe-shaped moving core fixed to said shaft, and stator members facing a circumferential surface and an end surface of said moving core.

19. A flow control valve according to claim 13, further comprising:

a mounting flange formed on an outer periphery of the housing, and having a mounting hole defined therethrough for receiving a fastener to fasten the housing to a supporting surface of an engine; and
at least three protrusions formed on said flange and extending axially therefrom to abut said supporting surface for disbursing a fastening force of the fastener.

20. A flow control valve according to claim 19, wherein:
one of said protrusions is located radially outwardly of the mounting hole with respect to a center of the housing, and each of the other protrusions is located at a respective side of a hypothetical line, which passes through the center of the housing and a center of the mounting hole, at a respective mounting angle between 5° and 160° formed between the hypothetical line and the respective protrusions.

21. A flow control valve according to claim 20, wherein:
each of said other protrusions has a tapered surface so that a centripetal force toward the center of the housing is generated by the tightening force.

* * * * *